United States Patent
Zimmermann et al.

(10) Patent No.: US 6,943,553 B2
(45) Date of Patent: Sep. 13, 2005

(54) METHOD AND APPARATUS FOR RAPID TOMOGRAPHIC MEASUREMENTS OF THE ELECTRICAL CONDUCTIVITY DISTRIBUTION OF A SAMPLE

(75) Inventors: Egon Zimmermann, Inden-Altdorf (DE); Walter Glaas, Elsdorf (DE); Arre Verweerd, Aachen (DE); Axel Tillmann, Aldenhoven (DE); Andreas Kemna, Düsseldorf (DE)

(73) Assignee: Forschungszentrum Julich GmbH, Julich (DE)

(*) Notice: Subject to any disclaimer, the term of this patent is extended or adjusted under 35 U.S.C. 154(b) by 0 days.

(21) Appl. No.: 10/647,095

(22) Filed: Aug. 22, 2003

(65) Prior Publication Data

US 2004/0201380 A1 Oct. 14, 2004

(30) Foreign Application Priority Data

Aug. 23, 2002 (DE) .......................................... 102 38 824

(51) Int. Cl.⁷ ................................................. G01V 3/04
(52) U.S. Cl. ....................................... 324/357; 600/547
(58) Field of Search ................................. 324/318, 357; 600/547, 458

(56) References Cited

U.S. PATENT DOCUMENTS

| | | | | |
|---|---|---|---|---|
| 5,258,709 A | * | 11/1993 | Laukien | 324/309 |
| 5,659,281 A | * | 8/1997 | Pissanetzky et al. | 335/296 |
| 5,743,266 A | * | 4/1998 | Levene et al. | 600/458 |
| 5,810,742 A | * | 9/1998 | Pearlman | 600/547 |
| 5,914,603 A | | 6/1999 | Daily | |
| 6,026,173 A | * | 2/2000 | Svenson et al. | 382/131 |
| 6,167,300 A | | 12/2000 | Cherepenin | |
| 6,682,492 B1 | * | 1/2004 | Joensuu | 600/561 |
| 2001/0051774 A1 | * | 12/2001 | Littrup et al. | 600/547 |
| 2004/0077944 A1 | * | 4/2004 | Steinberg et al. | 600/436 |

FOREIGN PATENT DOCUMENTS

| | | |
|---|---|---|
| DE | 691 15 275 | 6/1990 |
| DE | 43 32 257 | 3/1995 |
| DE | 44 12 994 | 8/1995 |
| DE | 198 37 828 | 4/2000 |
| WO | 02 053 029 | 7/2002 |

OTHER PUBLICATIONS

"Electrical Impedance Tomography", M.Cheney, Siam Review vol. 41,No. 1,pp. 85–101, 17 pgs.

"Medical Impendance Tomography Ad Pprocess Impedance Toography . . . ", Brian H.Brown, Meas.Sci.Technoly 12(2001) 991–996, 6 pgs.

"Electrical Resistance Tomography to Detect Leaks from Buried Pipes", Josep Jordana et al, Meas.Sci.Technol.12 (2001) 1061–1068, 8 pgs.

* cited by examiner

Primary Examiner—Charles H. Nolan, Jr.
(74) Attorney, Agent, or Firm—Herbert Dubno (57) ABSTRACT

A method and apparatus for the rapid tomographic measurement of conductivity distribution in a sample in which current excitations or voltage excitation is applied to the sample via electrodes or the like and potential differences or magnetic field strengths association with those excitation fields are measured and analyzed, e.g. by a Fourier analysis.

32 Claims, 5 Drawing Sheets

METHOD AND APPARATUS FOR RAPID TOMOGRAPHIC MEASUREMENTS OF THE ELECTRICAL CONDUCTIVITY DISTRIBUTION OF A SAMPLE

CROSS REFERENCE TO RELATED APPLICATIONS

This application claims the priority of German application 102 38 824.5 filed 23 Aug. 2002 under the International Convention.

FIELD OF THE INVENTION

Our present invention relates to a method and apparatus for the rapid tomographic measurement of the electrical conductivity distribution in a sample.

BACKGROUND OF THE INVENTION

Reference to tomographic measurements of electrical conductivity distribution in a sample are intended to mean that the conductivity distribution of a sample, which can be a ground sample, aquifer sample, other geological sample, but also biological materials and the like in turn of the various cross sections through the sample.

For understanding of practically all significant questions in conjunction with heterogeneously structured samples, a knowledge of the spatial structure of the sample is of paramount significance. In the case of a heterogeneously structured sample, for example ground, aquifers and other geological samples, this knowledge has required above all invasive processes, for example, test drilling. Such invasive processes have the drawback that they alter the conditions in the sample. Furthermore, the determination of the structure only takes place at selected points in the sample. Important relationships can remain undiscovered and this applies in particular to transport processes in subterranean strata.

More recently, less intensive geophysical and geoelectrical methods have been developed for geological investigations. It is possible, for example, to measure a variety of geological parameters by noninvasive methods or methods which are less invasive, utilizing sensors which can be forced into the ground or are provided in the region of the ground and which measure geological parameters directly or measure parameters which can be interpreted in turn by biological structures.

For example, a geoelectric method is known whereby at least two electrodes are inserted into the ground and a voltage measuring unit is connected with the electrodes so that the electrical potential distribution can be measured and from that distribution the electrical conductivity distribution can be determined.

Another method known to the art, namely, controlled source audiomagnetotelluric (CSAMT) provides one or more electrical dipoles in the ground which are driven in the frequency range of 1 Hz to 8 kHz at a relatively large distance from such a dipole (often several kilometers) a magnetic and electrical component of the radiated electromagnetic waves are measured. With this process geological structures can be determined at a considerable depth and distance.

A geoelectromagnetic method is likewise known whereby the ground is excited with coils on the ground surface or by means of a transmitter spaced therefrom and a magnetic field induced subterraneously by reaction with external magnetic field is measured.

From DE 198 37 828, a method of calculating a current density distribution in a subterranean sample is known in which two electrodes are implanted in the ground sample. A low-frequency electrical alternating current is supplied to the electrode and a current density distribution of this current is effected in the subterranean sample as a function of the conductivity distribution therein. This results in a magnetic field intensity distribution which can be measured with the aid of a magnetic field sensor. From the magnetic field distribution the current density distribution can be calculated. This in turn allows the conductivity distribution in the subterranean sample to be determined. The conductivity of the sample is the target value and allows properties of the sample to be determined. DE 198 37 828 also discloses an apparatus for carrying out that method using a lock-in amplifier evaluating the measured signal.

As a general matter, in conductometry the measurement of the voltage drop or the potential difference in a sample to be investigated is a prerequisite for calculating the conductivity of the sample. For this purpose, the sample can be supplied for example with alternating current. From the measured potential differences and the amplitude of the current measured in the conductors supplying that alternating current, the specific electrical resistance and its converse, the conductivity of the sample, can be calculated. In cases in which the magnetic field strength distribution is to be measured, the conductivity of the sample can be calculated as well from the measured current amplitude and the magnetic field strength.

In geoelectric measurements the multidimensional conductivity distribution in samples can be determined for example by the application of current and the measurement of potential differences. For this purpose, the sample is usually contacted with a large number of electrodes. An alternating current is preferably launched into the sample by each two electrodes of this array of electrodes, for example into the ground. Each application of alternating current generates an associated electric potential distribution as a function of the electrical conductivity distribution in the sample. At other electrodes the potential difference is measured.

From the measured electrical potential and/or the measured magnetic field for a sufficiently large number of different applications of electrical excitation signals, the conductivity distribution in the sample can be calculated by means of special calculating techniques. The method of application of current and measurement of electrical or magnetic fields is used in many geophysical investigations with different electrode arrangements, like, for example, the Schlumberger sounding, Wenner mapping, dipole-dipole arrangements, four-point measurements in two-dimensional or three-dimensional tomography (electrical resistivity tomography: ERT) with flat or round electrode elements.

A drawback of earlier measurement systems and methods is that the current supply requires energization of respective pairs of electrodes of the entire set. The total measurement time thus corresponds to the sum of the individual measurements for an excitation. The total measurement time is a function of the measurement arrangement and the desired resolution and precision and thus can be very long. When for example an individual measurement for a particular precision requires a measurement time of 30 minutes, the total measurement time for 10 excitations can consume 5 hours. In samples in which the conductivity distribution is the targeted parameter and the measurement should be carried out in a shorter period of time, the measurement devices of the prior art have not been found to be suitable.

In Cheney et al (Cheney, M., Isaacson, D., Newell, J. D., 1999. Electrical impedance tomography. SIAM Review, Vol. 41. pp 85–101) a method of electrical impedance tomography has been described in which the electrical conductivity measurement of a human body utilizes the application of electric currents independently from one another and in succession. A drawback of this system is that the measurement device is only suitable for samples like those of the human body. More complex samples, for example, geophysical samples, cannot be characterized by such systems or are characterizable only limitedly by them.

OBJECTS OF THE INVENTION

It is, therefore, the principal object of the present invention to provide a noninvasive method for the rapid tomographic measurement of conductivity distribution in a sample with high resolution, especially for the variation of the conductivity distribution with time.

Another object of the invention is to provide an improved apparatus for a rapid tomographic evaluation of a complex sample like a geophysical sample.

Still another object of the invention is to provide a method of and an apparatus for the rapid tomographic measurements of a conductivity distribution whereby drawbacks of prior art systems are avoided.

SUMMARY OF THE INVENTION

These objects and others which will become apparent hereinafter are attained, in accordance with the invention, in a method for the rapid tomographic measurement of conductivity distribution in a sample which comprises the steps of:

(a) launching electrical excitation signals simultaneously into a sample from a multiplicity of locations distributed in the sample;

(b) measuring at a multiplicity of locations in the sample at least one parameter selected from the group which consists of potential difference and magnetic field strength resulting from the electrical excitation signals; and c) correlating the measured potential differences or magnetic field strengths with the launched excitation signals to provide conductivity distribution cross section in same sample.

A method can be carried out, according to the invention with an apparatus which comprises:

an electrical excitation source coupled with the sample for applying electrical excitation signals thereto;

at least one device coupled with the sample for measuring a potential difference or magnetic field strength therein in proportion to the electrical excitation signals supplied thereto; and circuitry for correlating measured potential difference or magnetic field strength proportionally with the supplied electrical excitation signals.

The method of the invention thus applies a multiplicity of electrical excitation signals simultaneously to the sample to be explored and a correlation of the measured signals (potential differences and/or magnetic field strength) proportional to the fed electrical excitation signals is carried out.

The advantage of the method of the invention is primarily to be found in the substantial measurement time which is required by comparison to the measurement methods involved sequential applications of the electrical excitation signal as required by the art. This means that by contrast with n sequential applications of an excitation signal to respective pairs of electrodes as is known in the art, with the method of the invention only a single application of n excitation signals to a multiplicity of spaced-apart excitation electrodes is effected in parallel. The measurement time is reduced by a factor n to 1/n of the prior art measurement duration. This enables a better evaluation of the sample at a particular time, especially when the conductivity distribution in a sample may not have reached a steady state. This is especially the case in flow processes. The method is for the most part noninvasive since the insertion of the electrode at the multiplicity of locations can be done without significant disturbance of the sample, especially in the case of geological samples.

According to a feature of the invention, the electrical excitation signals launched in the sample are applied to the latter as orthogonal signals. Two signals are orthogonal to one another and thus mutually independent when the scaler product of the orthogonal signals written in vector form is zero. The requirement herein that orthogonal excitation signals be applied is, however, not a requirement that only two mutually orthogonal excitation signals be applied at each excitation point. In other words, usually the method of the invention will apply the excitation from a multiplicity of electrodes simultaneously in a sample to be investigated. Each excitation produces an associated current density distribution as a function of the electrical conductivity distribution. The different signals are applied by means of electrodes at the respective locations and by energization of these electrodes at the respective positions by appropriate circuitry. The resulting potential field distribution and/or magnetic distribution measured in each case will be the sum of all of the orthogonal excitation signals over a particular region. Each measurement, therefore, is not restricted to two mutually orthogonal excitation signals.

The measured potential and/or magnetic field strength distributions can be broken down based upon the orthogonality of the excitation signal in accordance with the proportion from each excitation signal and thus the relationship of the current density distribution to that excitation signal can be determined. The application of orthogonal signals thus serves as a means whereby a multiplicity of electrical excitation signals can be supplied at different launching positions simultaneously to enable different current density distributions to be created in the sample and resulting measurement signals to be separated and associated with them.

As a consequence it is possible for the measured electromagnetic distributions of potential differences and/or magnetic field strengths, to be broken down and associated with the excitation signals and thus coordinated with them.

The rapid investigation of complex three-dimensional samples like ground samples, aquifers and other biophysical samples can be undertaken in a rapid tomographic manner.

The electrical excitation signal can advantageously be orthogonal sinusoidal signals which are applied to the sample via electrodes. The individual signals can be of the type analyzable with a cosine series, sine series or Fourier series.

From the measured signal, for example corresponding to a term in the resulting Fourier series, the defining equation for the Fourier coefficients can be easily calculated.

In accordance with a further feature of the invention for the orthogonal sinusoidal signals, only the individual terms of the cosine series can be fed to the sample and the measured signals separated into the cosine portion of a Fourier series by a means-defining equation for the Fourier coefficients. This provides an especially simple method for determining the real part of the electrical conductivity distribution.

An additional separation of the signal to obtain the sine component (imaginary part) of the Fourier series enables the distribution of the complex electrical conductivity to be determined for the sample. A method of this type is interesting especially for investigation of such samples which show a phase shift between the current and variety because of induced polarization effects. In this case, in addition to the cosine component, the Fourier coefficients of the sine part can be calculated. This method supplies a greater amount of information with respect to the material of the sample since it takes into consideration both electrical conductivity and polarization phenomena. The method forms the basis for an electrical impedance tomography independently of whether the potential differences or magnetic field strengths are measured.

Instead of continuous orthogonal sinusoidal scans, simple orthogonal coding binary signals can be used which can assume only two possible amplitudes, for example +1 and −1. A single bit sequence is then so coded with the individual sequences (vectors) are orthogonal to one another. In this manner a simultaneous application of the excitation signal and a decomposition of the measured signal into respective components relating to the excitation signals is possible. These binary signals can contribute to a further simplification since it is only necessary to time the switch between two states. The computer costs for decomposing the signals into orthogonal components is less and it is, of course, much simpler to carry out the method of the invention.

The rapid measurement of potential differences, according to another feature of the invention, utilizes at least three electrodes for excitation of the sample. Then at least two additional electrodes can be used for measurement of the potential distribution by being inserted into the sample. As a consequence, electrical excitation signals are applied simultaneously with measurement of the potential distribution.

Electrical excitation signals can be simultaneously applied to at least a part of the excitation electrodes so as to obtain in a targeted manner for each excitation signal an associated characteristic current density distribution in the sample, whereby potential differences are obtained in the sample as a function of the conductivity distribution. These values are determined as a function of the positions of the electrodes in the sample in proportion to the voltage.

From the measured potential differences and the electrical excitation signals, and the current amplitude, the specific electrical resistance or its inverse conductivity distribution in the sample can be calculated as target parameters. The excitation signals and the measurement of the potential differences can be carried out using the same electrodes, at least in part. In this case, the excitation signals may be electric current from a high ohmic current source. The interfacial resistance between electrodes and the sample are taken into consideration in the later calculation of the resistance distribution. In a preferred embodiment, electrodes in the form of electrode spikes are provided which have electrode surfaces which are electrically decoupled from one another, one surface of each electrode being utilized to feed the electrical excitation signal while another is used to measure the potential. The use of a single electrode for applying the excitation signal and for measuring the potential keeps the cost of the apparatus for producing the method relatively low. The electrode spikes can have a tip of solid metal forming the potential measuring portion separated by an annular insulator form a metal jacket or tube forming the portion for applying the excitation voltage.

The method need not be used exclusively for tomographic measurement of potential differences but can also be employed for rapid measurement of magnetic field strength in the sample. Preferably both potential differences and magnetic field strengths can be measured.

In accordance with the invention at least three electrodes in spaced-apart relationship in the sample are used for feeding the electrical excitation signals into the sample. At least one magnetic field sensor is then provided in or adjacent the sample for measuring of a resultant magnetic field strength distribution at the surface, within the sample or outside the sample.

Simultaneously electrical signals are supplied to the sample from at least a portion of at least three electrodes with the goal of producing for each excitation signal an independent current density distribution in the sample. As a result, within the sample there arises independently of the conductivity distribution a current density distribution which is superimposed for all signals and which produces a magnetic field distribution which can be measured by the magnetic field sensor or sensors at selected spaced-apart points.

The correlation of the measured magnetic field intensity distribution in proportion to the applied electrical excitation signal can allow the respective magnetic field distribution for each current distribution to be determined. From the known electrical signal strength at the excitation electrode, e.g. as measured in terms of the current through the respective electrode and the measured magnetic strength, the conductivity distribution can be calculated.

In spite of or in addition electrodes for excitation of the sample at least two coils can be sued to increase the flexibility of the method.

It is especially advantageous, therefore, to measure both potential differences and magnetic field strengths. It is thus possible, within the scope of the present invention, to provide coils as well as electrodes for applying the excitation in the form of electrical or electromagnetic signals and for measuring eh potential differences and/or magnetic field strengths which arise, e.g. through the use of further electrodes and/or magnetic field sensors. From these results the complex conductivity distribution of the sample can be calculated. With simultaneous measurement of potential differences and magnetic field strengths, the spatial resolution of the conductivity distribution in the sample can be significantly raised. In this case in addition to the electrodes for measuring the potential differences, at least one and preferably a plurality of magnetic field sensors can also be used to determine the magnetic field strength distribution.

It is advantageous to launch the electric signals as alternating current or alternating voltages into the sample. This can be done in a simple manner utilizing for example alternating current or alternating voltage generators. Independently of the method of calculation to determine the conductivity distribution, the current or voltage which is applied as the excitation signal can be measured at or in circuit with the electrodes insofar as these values are not known.

It is also possible, in accordance with the invention not to use the advantage of a shortened measuring time but rather to carry out the method with a sequential excitation of the sample. In this case, the statistical precision of the measurements for a given electrical excitation energy per excitation signal can be significantly better or one can achieve the same statistical precision as with a lesser amount of excitation energy per excitation signal. In the latter case, the excitation signals per electrode can be selected to be significantly weaker as a greater number of electrodes are provided. This is especially important for measurements in samples which are highly nonlinear since in those cases, unlike media with linear qualities, a reduced current per electrode can provide better tomographic imaging.

An apparatus for the rapid measurement of conductivity distribution in a sample can comprise a first means for applying an electrical excitation signal to the sample and a second means for measuring the resulting potential differences and/or magnetic field strengths. The apparatus can comprise yet further means for simultaneous application of the electrical excitation signals to the sample as well as means for separating the measurement signals, i.e. decomposing them, so that a correlation of the measured potential differences and/or magnetic field strengths in proportion to the applied electrical excitation signal is possible and thus the respective current distribution can be determined.

Furthermore it is advantageous to synchronize the means for generating the excitation signal and means for acquiring the measured signal in a temporal manner. That ensures that tomographic measurements of the multidimensional complex conductivity distribution in a sample can be effected rapidly. In addition, the separation of the measured signals into orthogonal signals is facilitated.

The means for feeding electrical signals into the sample can comprise electrodes and/or coils.

The means for measuring the resulting potential difference and/or magnetic field strength, in turn, can be electrodes and/or magnetic field sensors.

The apparatus can also comprise a control unit, e.g. a computer which can form the means for simultaneously applying the electrical excitation signal to the electrodes and/or coils in the sample and for acquiring the measured signal and/or decomposing them into the respective components to effect the correlation previously described. This computer-controlled unit can produce mutually orthogonal electrical excitation signals and enable the separation of the measured potential differences and/or magnetic field strength proportionally to the fed electrical signals.

The apparatus can generate the orthogonal signals (sinusoidal signals or orthogonal coded signals) and apply them to the electrodes or coils.

The apparatus for example can have at least two generators forming part of the control and computer unit for producing orthogonal electrical signals. Conductors between the electrodes and the generators serve to deliver the electrical signal for excitation purposes to the sample.

A separating stage can be provided as part of the control and computer units to break down the measured signals (potential differences and/or magnetic field strengths) in proportion to the excitation signals fed to the sample and enable the correlation.

The apparatus also includes, advantageously an evaluating unit or stage for calculating the conductivity distribution from the measured potential differences and/or the measured magnetic field strength as well as the known data for the excitation signals (current amplitudes and/or voltages.

To feed the electrical excitation signals into the sample, at least three electrodes can be provided. The more electrodes which are used for independent application of excitation signals, the better will be the spatial resolution of the tomographic measurements in the sample.

The second means for measuring the potential difference should comprise at least two electrodes. Again, when a greater number of electrodes are provided for measurement of the potential difference, the more precise will be the measurement and hence the tomographic analysis.

According to a feature of the invention, therefore, the first means for exciting the sample can have at least three electrodes which can be in the form of electrode spikes and which are driven into the sample, usually a geological sample. The spikes may have, in addition, surfaces for measuring the potential difference. By comparison with earlier systems, an arrangement in which the spike, according to the invention, serves both for applying the excitation signal to the sample and for measuring the potential difference, affords a considerable saving in the number of electrodes which are used. The metal tips of the spikes can serve as the electrodes for potential measurement while the jackets of the spikes form the excitation electrodes. The jackets and tips are electrically separated from one another. Electrode spikes of this type can be driven into relatively dense samples like ground samples and aquifer samples. Installation of such electrodes in the sample can be carried out in less than half the time previously required for placing electrodes in a sample at least in part because a single spike can serve both for excitation and measurement. The placing of the electrodes can simplify and speed up the investigations of relatively complex ground samples as a result.

Instead of or in addition to the electrodes, at least two coils can be placed in or adjacent the sample for applying a magnetic field thereto. The coils induce primary magnetic fields which can result in eddy currents within the sample and the resulting overall magnetic activity can be registered by means of at least one magnetic field sensor. Electrodes can also serve to measure potential differences arising from the eddy currents in the sample.

The apparatus according to the invention can thus include at least two electrodes, in addition to those used for excitation, for measuring the potential difference and at lest one magnetic field sensor for the simultaneous measurement of a magnetic field strength. This combination affords excellent resolution with respect to conductivity distribution determinations.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
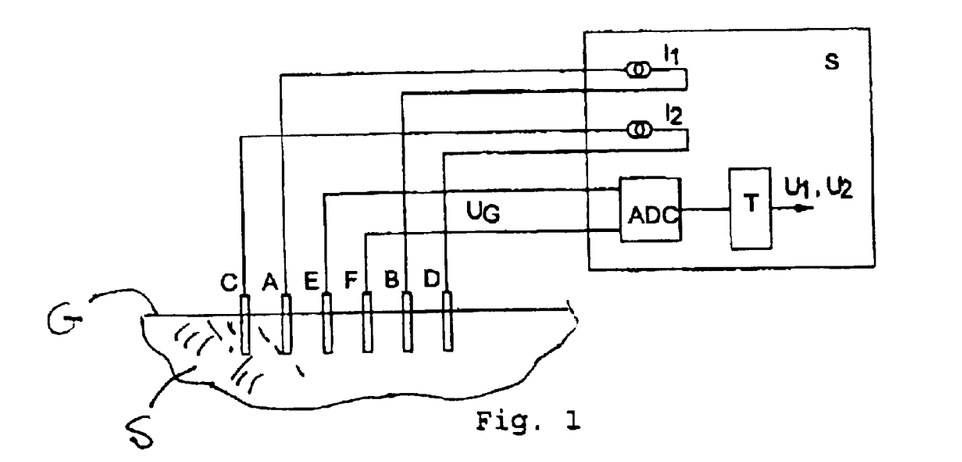
FIG. 1 is a highly schematic illustration of an apparatus for tomographic conductivity determination in a sample.

FIG. 1 shows in highly schematic manner an application of the invention in which geoelectric resistance soundings are taken in accordance with the Schlumberger principle, modified in accordance with the invention. An electrode pair consisting of electrodes E and F serves for the measurement of a potential difference $U_G$ while two further electrode pairs A and B as well as C and D serve to launch alternating current signals I1 and I2 into the ground structure in which the electrodes are inserted. The latter forms the sample S which is below grade G. The current signals I1 and I2 are time-continuous, orthogonal sinusoidal signals $$I_i = c_i \cos(i\omega_0 t)$$

where Ci is a peak value of the excitation alternating current amplitude and t is time, i being the number of signals 1 and 2 and $\omega_0$ is the base frequency $\omega_0 = 2\pi f_0$.

The signals correspond to the cosine term of a Fourier series and are orthogonal since the prerequisite for orthogonal signals is $$\int_0^T I_i(t) I_k(t) \, dt = 0 \text{ for } i \neq k$$

where i=1 or 2, k=1 or 2.

In this example, only the first two terms are selected.

The sinusoidal excitation signals have the frequencies $1\omega_0$ and $2\omega_0$. The integration time T is, as a rule, the duration of a period $1/f_0$ or a multiple of $1/f_0$. Because of the excitation with the independent currents $I_1$ and $I_2$, two geometrically different current density distributions $j_1$ and $j_2$ arise in the subterranean sample. For low excitation frequencies and a real value specific resistance distribution in the sample, the measured potential difference is given by $$U_G = \sum_i a_i \cos(i\omega_0 t) = \sum_i U_i \quad (1)$$

with i=1 and 2, $a_i$ is the peak value of the proportional measured voltage amplitude and $\omega_0$ is the base frequency of the excitation signals launched into the sample.

The measured potential differences are derived from the cosine terms of the Fourier series and can be decomposed into the individual voltage components $U_i$ (or potential differences) with the frequencies $1\omega_0$ and $2\omega_0$ which are generated by the currents $I_1$ and $I_2$. The peak values $a_i$ are the real coefficients of the Fourier series and are determined by the defining equations for the Fourier coefficients:

$$a_i = \frac{2}{T} \int_0^T U_G(t) \cos(i\omega_0 t) \, dt$$

For the proportional potential differences $$U_i = a_i \cos(i\omega_0 t)$$

applies.

From the known excitation current $I_i$, the voltage $U_i$ and the known geometric positions of the electrodes, the conductivity distribution in the sample can be determined. The resolution increases with the number of measuring electrodes and with the number of geometrically different current density distributions in the samples which are produced by means of the orthogonal excitation current.

For samples which generate a phase shift between current and voltage, an expansion of equation (1) is required. The measured phase-shifted voltage $U_G$ $$U_G = \sum_i a_i \cos(i\omega_0 t) + b_i \sin(i\omega_0 t) = \sum_i U_i$$

is determined by the voltage components $U_i$ together. The additional coefficients $b_i$ are also determined by the defining equation for the Fourier coefficients (in this case, the sine components):

$$b_i = \frac{2}{T} \int_0^T U_G(t) \sin(i\omega_0 t) \, dt \quad i = [1, 2]$$

The partial voltages with which the respective excitation currents are associated are thus:

$$U_i = a_i \cos(i\omega_0 t) + b_i \sin(i\omega_0 t).$$

The phase shift $(-\arctan(b_i/a_i))$ and the amplitude $\sqrt{(a^2+b^2)}$ of partial voltages $U_i$ phase shifted relative to the currents $I_i$ are thus known.

The latter analysis also supplies the amplitudes of the partial voltages $U_i$ when the exact phases of the excitation signals are not known. This is especially important when no seperating stage synchronization generator is used, since they generate a sinusoidal signal with unknown phase position. For simple resistance tomography no synchronizing generators are required in accordance with this method. When one starts with real specific resistances of the sample, the phase shift can only stem from nonsynchronized generators and is thus without significance.

The number of the current $I_i$ is, as in this example, not limited to two, but can be optionally increased. By way of example, with a base frequence $f_0$ of 0.1 Hz in a frequency range of 10 Hz to 19.9 Hz, 1000 orthogonal signals can be accommodated. The minimum measurement time in this case was $1/f_0=10$ seconds. One should, however, choose a time window T in the steady-state of the system so that the measurement as a rule is lengthened by the transient time.

Instead of a time-continuous sinusoidal excitation signal, we can use discrete-time signals $$I_{i,n} = c_i \cos(i\omega_0 n T_a) \quad I=[1,2]$$

with the scanning time $T_a$ and the number n of the scanning value in the range 1 to N. The latter can be generated and processes simply by means of digital data processing. The currents $I_1$ and $I_2$ in this case are orthogonal vectors with respective N values. The number N is so chosen that $N*T_a=1/f_0$ or a multiple of $1/f_0$.

In the practical application, the excitation currents are generated locally or centrally and applied to the electrodes and are phase-synchronized with respect to one another and to the separating stage T by the control and computing unit S so that the mathematically required operations corresponding to the above-mentioned equations can be correctly carried out in the unit S. The unit S encompasses at least two generators for producing orthogonal signals. They can be quartz-controlled sine wave generators whose frequencies can be adjusted in accordance with the foregoing example. The signals can, as necessary, be further amplified by power amplifiers with current or voltage outputs.

Even better is an excitation generator in which the orthogonal signals (for example cosine signals with frequencies $i*f_0$) are calculated by a PC or some other computer unit and are simultaneously outputted over a corresponding number of DAC (digital-analog-converter)channels and respective power amplifiers.

In the case of orthogonal coded signals, the DACs and the power amplifier(s) can be replaces by simple power switches which switch between two levels. This affords a further simplification.

The separating stage T, which serves to separate the measured signals and which is contained in the unit S, is comprised in the simplest case of an ADC (analog-digital-converter) which digitalizes the signals, and a computing unit which decomposes the signals into components associated with the respective excitation signals.

The computer in the unit S can be realized as a PC, a microcontroller, microprocessor, digital signal processor or other programmable component capable of fulfilling the indicated requirements. An analog computer or computing unit is also possible.

This example is applicable to determinations of specific resistance in resistance depth soundings according to Schlumberger in subterranean samples at different depth regions simultaneously.

The method is not, however, limited only to geoelectric measurements, but can be used for all investigations for which previously a sequential application of current sources or voltage sources was provided.

Figure 2:
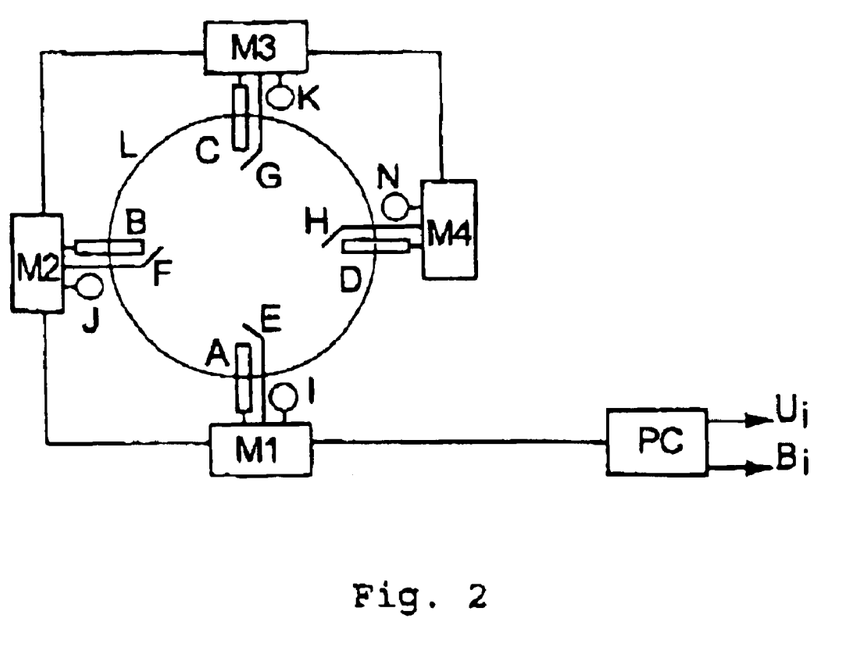
FIG. 2 is a diagram of another apparatus in accordance with the invention.

A further example has been illustrated in FIG. 2. This arrangement, shown in highly schematic form, constitutes a device for rapid tomographic investigation of the conductivity characteristics in heterogeneous samples, here a lysimeter. The lysimeter L is shown as a cylinder in plan view. In addition to electrodes illustrated in FIG. 1, in this embodiment two further electrodes G and H have been provided for measuring the potential difference.

The alternating currents or alternating voltages re generated in the modules M1 to M4. These modules are controlled by PCs or microprocessors. The separation of the measured signals is effected either in the modules or in the PC. The arrangement of the electrode corresponds to that in a typical electrical resistance tomographic application (ERT). For each electrode, the resistance between the electrode and the ground must be constituted in calculating the conductivity subsequently. Current sources are preferred for the excitation signal.

In a further embodiment of the invention, instead of the electrode pairs C-G, H-D A-E and B-F, four electrode spikes can be used for feeding the electrode excitation signal to the sample and can have two electrically decoupled surfaces for the simultaneous potential measurement (see the concurrently copending application Ser. No. 10/647,130 corresponding to German application 102 38 823.7 filed 23 Aug. 2002.

In addition to the potential differences or instead of a potential difference measurement, the magnetic field can be measured. In FIG. 2 the magnetic field sensors have been indicated at I, J, K and N. This arrangement can also be used for exploring neighboring surfaces of the ground by corresponding geoelectric and/or geomagnetic methods.

Of course the number of electrodes used can be increased as required to obtain a higher resolution. Thus the number electrodes shown in FIG. 2 should be considered only exemplary.

In general the method of measuring the spatial distribution of electromagnetic fields like potential distributions and magnetic field strength distributions can be applicable to any kind of sample to which electrical signals can be effectively applied. From the measured potential differences and/or magnetic field strengths and known strengths of the alternating current which are fed to the samples, specific resistances or conductivity distribution in the sample can be calculated.

Figure 3:
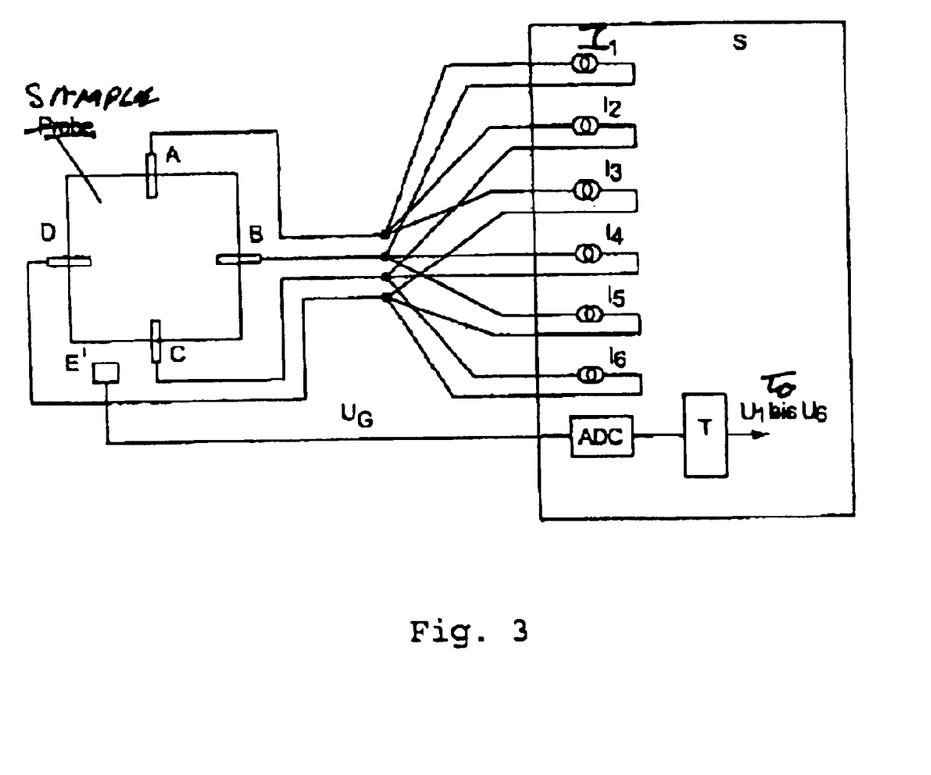
FIG. 3 shows the excitation of a sample with a multiplicity of generators so that orthogonal signals are produced.
Figure 4:
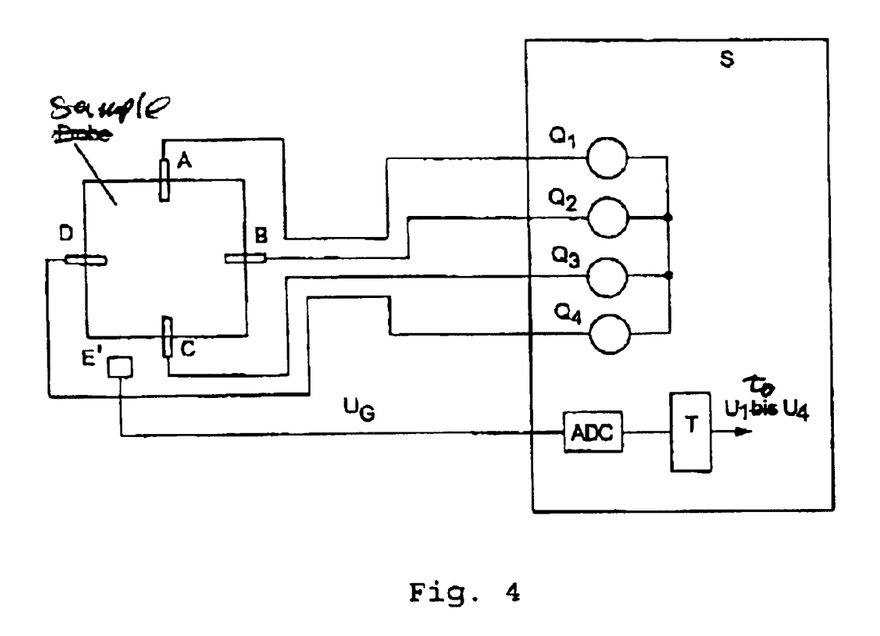
FIG. 4 shows still another apparatus in accordance with the invention.

FIG. 3 shows an arrangement corresponding to FIG. 4 with four excitation electrodes. The sample is a square body. Instead of the potential measurement with the electrodes E–F as in FIG. 1. In FIG. 3 the magnetic field is measured with a magnetic sensor E' and converted into a voltage $U_G$. This voltage is fed to an analog to digital converter ADC and then supplied to the separating stage T and decomposed to the components $U_1$–$U_6$ corresponding to the respective excitation currents.

In this system, in addition to the two currents $I_1$ and $I_2$ four further currents $I_3$ to $I_6$ are generated and applied. With four excitation electrodes and current feed to respective electrode pairs, a maximum of six geometrically different current density distributions can be produced in the sample by means of six mutually orthogonal excitation currents. In this embodiment, therefore, all possible combinations of the current fed to the respective pairs of electrodes (AB, AC, AD, BC, BD, CD) are used.

FIG. 4 shows an arrangement similar to that of FIG. 3.

Here, however, instead of six excitation currents $I_1$ to $I_6$ four excitation voltages $Q_1$ to $Q_4$ are generated and applied to the electrodes A, B, C, D. With four excitation electrodes and voltage feeds, a maximum number of the independent current density distributions can be produced in the sample utilizing four mutually orthogonal excitation voltages. In this case, the pickup E' provides the signal $U_G$ of the analog digital converter ADC and the separator T from which four voltage components $Q_1$ to $Q_4$ corresponding to the excitation voltages are obtained.

Figure 5:
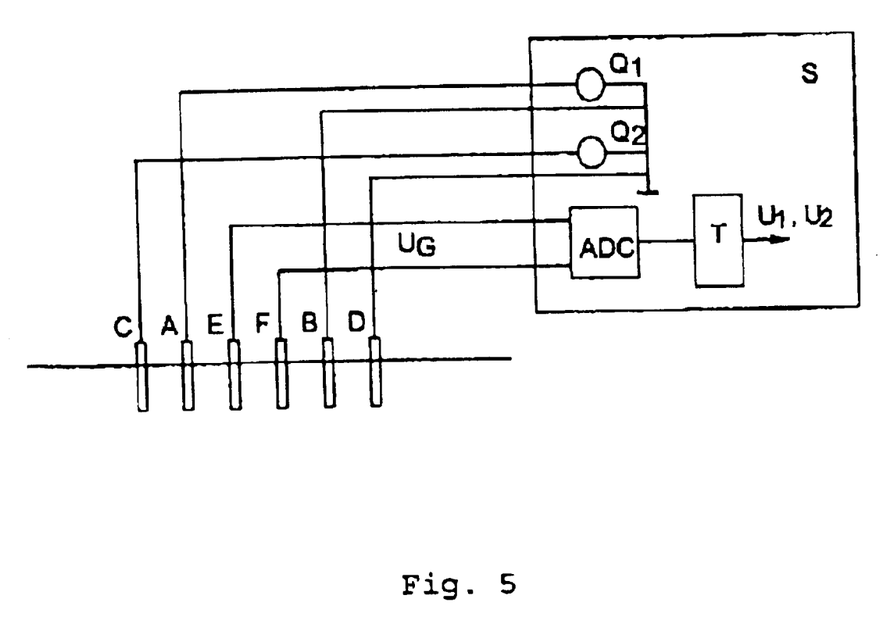
FIG. 5 is a diagram similar to FIG. 1 but illustrating another aspect of the invention.

In FIG. 5, instead of orthogonal continuous sinusoidal signals, simple binary orthogonal coded signals are used which can assume only amplitudes +C and −C. To the electrode pairs A and B and C and D, the values of the alternating voltages ($Q_1$ and $Q_2$) are applied where, for example, $$Q_i = c\, S_i,$$

where i=1, 2 and $$S_1 = (-1, +1, +1, -1),$$

$$S_2 = (+1, +1, -1, -1).$$

The signals are applied in succession in this order. The Signals $S_1$ and $S_2$ are orthogonal to one another since the potentials at the electrodes B and D are always equal to this scale of product of $S_1$ and $S_2$ is zero.

$$S_i S_k^T = 0 \text{ for } i \neq k,$$

with i=1 or 2, with k=1 or 2.

Thus $Q_1$ and $Q_2$ are also orthogonal to one another. Based on the feed with independent voltages $Q_1$ and $Q_2$, in the subterranean sample two independent current density distributions $j_1$ and $j_2$ develop in the subterranean sample. For low excitation frequencies and real specific resistance of the sample, the measured potential difference is:

$$U_G = \sum_i a_i S_i = \sum_i U_i$$

with i=1 and 2, $a_i$=measurement voltage amplitude.

The measured potential difference collects the signals $S_i$. The real coefficients $a_i$ are determined by means of the scaler products from $U_G$ and $S_i$ in accordance with the following equation:

$$a_i = (U_G S_i^T)/N$$

where N is the number of the value of each vector.

In this example, N=4. For the potential difference the following apply:

$$U_i = a_i S_i.$$

The excitation currents $I_{AB,G}$ and $I_{CD,G}$ which flow the electrode pair are measured and decomposed into to components $I_{AB,i}$ and $I_{CD,i}$, based upon $$IAB, i = b_{AB,i} S_i \text{ with } b_{AB,i} = (I_{AB,G} S_i^T)/N, \text{ and}$$

$$IAB, i = b_{AB,i} S_i \text{ with } b_{AB,i} = (I_{AB,G} S_i^T)/N,$$

from the determined excitation current components, the voltages $U_i$ and the known geometric positions of the electrodes, the specific resistance distribution in the sample can be determined. In this example the resolution as to location can be enhanced by the use of further excitation electrodes, orthogonal current feeds and measurement sensors.

The invention is applicable, inter alia, to the following fields in geophysics:

Determination of the concentration of soluble substances in the ground and in ground water aquifers by the determination of conductivity distributions in accordance with the invention.

Observation of chemical processes by measurements of the variation in space and time of the conductivity distribution (for example precipitation reactions).

Trace analysis and investigation of electrical anomalies (to determine the presence or absence of metallic bodies, ores, conductors, archeological objects and the like.

Detection and monitoring of preferred flow and transport paths in porous media (for example the ground, aquifers, rock structures, lysimeters.

Deposits of agrochemicals.

Catastrophe management in the case of industrial accidents.

Protection and environmental determination in industrial sites.

Monitoring of laboratory and agricultural facilities with respect to transport in porous media.

Determination of particle and colloid transport.

Investigations with respect to poorly conducting liquids in the ground in ground water, including development of water films on granular material and the location and distribution of contaminants like oil or contaminating organics, the sanitation of soil and the monitoring of waste dump for leakage.

Monitoring of dikes for leakage.

The exploration for water carrying or water guiding layers in arid or semiarid environments.

The monitoring of salt water/sweet water in subterranean systems including aquifers and agronomy.

The following fields of use in medicine are also applications of the invention:

Clinical monitoring for respiratory function, determination of lung and heart functions and in vivo investigations into impedance distribution in the thorax.

Basically the method and apparatus of the invention can also be used for material testing.

We claim:

1. A method for rapid tomographic measurement of conductivity distribution in a sample, comprising the steps of:
   (a) launching electrical excitation signals simultaneously into a sample from a multiplicity of locations distributed in said sample;
   (b) measuring at a multiplicity of locations in said sample at least one parameter selected from the group which consists of potential difference and magnetic field strength resulting from said electrical excitation signals; and
   (c) correlating the measured potential differences or magnetic field strengths with the launched excitation signals to provide conductivity distribution cross section in said sample;
   wherein the electrical excitation signals are launched as orthogonal signals into said sample; and
   (d) wherein the electrical excitation signals are launched as orthogonal signals into said sample.

2. The method defined in claim 1 wherein the electrical excitation signals are launched as orthogonal sinusoidal signals into said sample.

3. The method defined in claim 2 wherein in the measurement of said parameter at least one voltage component $a_i$, $b_i$ is determined using a defining equation of the Fourier-analysis cosine coefficients according to the formula:

$$a_i = \frac{2}{T} \int_0^T U_G(t) \cos(i\omega_0 t) dt$$

where $a_i$=peak value of the measured voltage amplitude;
$\omega_0$=fundamental frequency of the excitation signal;
i=the index of the excitation signal from 1 to $\infty$;
$U_G(t)$=measured potential difference; and
t=time or
using a defining equation of the Fourier-analysis sine coefficients according to the formula:

$$b_i = \frac{2}{T} \int_0^T U_G(t) \sin(i\omega_0 t) dt$$

where $b_i$=peak value of the measured voltage amplitude phase shifted by 90°;
$\omega_0$=fundamental frequency of the excitation signal;
i=the index of the excitation signal from 1 to $\infty$;
$U_G(t)$=measured potential difference; and
t=time.

4. The method defined in claim 3 wherein the coefficients $a_i$, $b_i$ are used to calculate a complex impedance of the sample.

5. The method defined in claim 1 wherein the excitation signals launched into said sample are coded signals.

6. The method defined in claim 1 wherein the excitation signals launched into said sample can assume either of only two possible amplitudes.

7. The method defined in claim 1 wherein at least three electrodes in spaced apart relationship are inserted into said sample for launching said excitation signals into said sample.

8. The method defined in claim 1 wherein at least two electrodes in spaced apart relationship are inserted into said sample for measuring potential differences therein.

9. The method defined in claim 1 wherein at least three electrodes in spaced apart relationship are inserted into said sample for launching said excitation signals into said sample and at least two electrodes in spaced apart relationship are inserted into said sample for measuring potential differences therein, said electrical excitation signals are applied to said sample at least a part of the three electrodes so that a potential distribution occurs in the sample and potential differences are measured at said at least two electrodes.

10. The method defined in claim 9 wherein said electrical excitation signals are applied simultaneously to said at least three electrodes and the measured potential differences are correlated proportionally with supplied electrical excitation signals.

11. The method defined in claim 1 wherein the electrical excitation signals are launched into said sample from the same electrodes with which measurements of the potential differences are made.

12. The method defined in claim 1 wherein said electrodes are spikes driven into the sample hand having electrically decoupled surfaces for applying said electrical excitation signals to said sample and measuring potential differences therein.

13. The method defined in claim 1 wherein said electrical excitation signals are applied with a high-ohmic current source.

14. The method defined in claim 1, further comprising exciting said sample by energizing two coils in contact with said sample.

15. The method defined in claim 1 wherein a magnetic field strength is measured by a magnetic field sensor brought into contact with said sample.

16. The method defined in claim 1 wherein the electrical excitation signals are applied to at least part of a plurality of excitation coils or excitation electrodes in contact with the sample and as a result of conductivity distribution therein a current density distribution and consequent magnetic field strength distribution are effected in the sample.

17. The method defined in claim 1 wherein the electrical excitation signals are applied to at least part of a plurality of excitation coils or excitation electrodes in contact with the sample and a correlation is made between a measured field strength distribution in proportion to the electrical excitation signals supplied.

18. The method defined in claim 1 wherein at least two of said electrodes for measuring potential difference and at least one magnetic field sensor for measuring a magnetic field strength are provided in said sample.

19. The method defined in claim 1 wherein at least three electrodes for applying an electrical excitation to said sample and at least one magnetic field sensor for measuring a magnetic field strength are provided in contact with said sample.

20. The method defined in claim 1 wherein said electrical excitation signals are formed by an alternating current fed to said sample.

21. The method defined in claim 1 wherein electrical excitation signals in the form of an alternating voltage are fed to the sample and the current amplitude in a conductor feeding said electrical excitation signals to the sample is measured.

22. An apparatus for the rapid tomographic measurement of a conductivity distribution in a sample, comprising:

an electrical excitation source coupled with said sample for applying electrical excitation signals thereto;

at least one device coupled with said sample for measuring a potential difference or magnetic field strength therein in proportion to the electrical excitation signals supplied thereto; and circuitry for correlating a measured potential difference or magnetic field strength proportionally with the supplied electrical excitation signals; and wherein said circuitry includes a control and computing unit which produces electrical orthogonal excitation signals and enabled a correlation of measured potential differences or magnetic field strengths porportionally with the electrical orthogonal excitation signals.

23. The apparatus defined in claim 22 wherein said control and computing unit comprises at least two generators for producing orthogonal electrical excitation signals.

24. The apparatus defined in claim 23, further comprising conductors for supplying said electrical excitation signals to the sample.

25. The apparatus defined in claim 24 wherein said circuitry includes an evaluation unit for calculating a conductivity distribution in said sample.

26. The apparatus defined in claim 25 wherein the electrical excitation source comprises at least three electrodes engaged in said sample and in spaced-apart relationship.

27. The apparatus defined in claim 26 wherein said at least one device comprises at least two electrodes in said sample for measuring electromagnetic fields therein.

28. The apparatus defined in claim 22 wherein the electrical excitation source comprises at least three electrodes engaged in said sample and in spaced-apart relationship, said electrodes being so configured as to enable a potential difference measurement between said electrodes.

29. An apparatus for the rapid tomographic measurement of a conductivity distribution in a sample, comprising:

an electrical excitation source coupled with said sample for applying electrical excitation signals thereto;

at least one device coupled with said sample for measuring a potential difference or magnetic field strength therein in proportion to the electrical excitation signals supplied thereto; and circuitry for correlating a measured potential difference or magnetic field strength proportionally with the supplied electrical excitation signals, said electrodes being in the form of spikes having excitation electrode surfaces electrically decoupled from potential measuring surfaces respectively along jackets and tips of the respective electrodes, said electrodes being in the form of spikes having excitation electrode surfaces electrically decoupled from potential measuring surfaces respectively along jackets and tips of the respective electrodes.

30. The apparatus defined in claim 22 wherein said source includes at least two coils as the exclusive source of excitation signals or in conjunction with excitation electrodes.

31. The apparatus defined in claim 22 wherein said device includes at least one magnetic field sensor as the exclusive means for measuring magnetic field strength or in conjunction with at least one electrode.

32. The apparatus defined in claim 22 wherein said circuitry includes a separating stage which decomposes the measured signals in proportion to the applied electrical excitation signals.

* * * * *